United States Patent
De Vleeschauwer et al.

(10) Patent No.: US 9,723,049 B2
(45) Date of Patent: Aug. 1, 2017

(54) ADAPTIVE STREAMING AWARE NETWORK NODE, CLIENT AND METHOD WITH PRIORITY MARKING

(71) Applicant: Alcatel Lucent, Boulogne Billancourt (FR)

(72) Inventors: Bart De Vleeschauwer, Schilde (BE); Rafael Huysegems, Walem (BE); Koen De Schepper, Edegem (BE)

(73) Assignee: Alcatel Lucent, Boulogne-Billancourt (FR)

(*) Notice: Subject to any disclaimer, the term of this patent is extended or adjusted under 35 U.S.C. 154(b) by 195 days.

(21) Appl. No.: 14/400,712

(22) PCT Filed: May 6, 2013

(86) PCT No.: PCT/EP2013/059355
§ 371 (c)(1),
(2) Date: Nov. 12, 2014

(87) PCT Pub. No.: WO2013/171082
PCT Pub. Date: Nov. 21, 2013

(65) Prior Publication Data
US 2015/0134784 A1 May 14, 2015

(30) Foreign Application Priority Data
May 14, 2012 (EP) ..................................... 12290161

(51) Int. Cl.
*H04L 29/06* (2006.01)
*H04L 29/08* (2006.01)
(Continued)

(52) U.S. Cl.
CPC .......... *H04L 65/80* (2013.01); *H04L 65/4069* (2013.01); *H04L 65/602* (2013.01);
(Continued)

(58) Field of Classification Search
None
See application file for complete search history.

(56) References Cited

U.S. PATENT DOCUMENTS 8,695,047 B2 * 4/2014 Chennupati ...... H04N 21/43615
370/395.21
2004/0001477 A1 1/2004 D'Amico et al.
(Continued)

FOREIGN PATENT DOCUMENTS

CN 1565128 1/2005
CN 1615649 5/2005
(Continued)

OTHER PUBLICATIONS

R. Razavi et al., "Unequal Protection of Encoded Video Streams in Bluetooth EDR," Packet Video, IEEE, pp. 263-271, XP031170622, 2007.
(Continued)

*Primary Examiner* — Jeffrey R Swearingen
(74) *Attorney, Agent, or Firm* — Fay Sharpe, LLP

(57) ABSTRACT

In adaptive streaming, video segments are available in one or more quality levels, and each video segment is delivered to the client (103) in a quality level specified in a request received from that client (103). In order to reduce the risk for buffer underrun, an adaptive streaming aware network node (101) comprises: —session monitoring means (111) for collecting buffer fill information indicative for a buffer volume at the client (101) occupied by a video session; —priority calculation means (112) for determining a priority level for video segments of the session in function of the buffer fill information; and —video segment marking means (113) for marking video segments of the session with the priority level.

9 Claims, 1 Drawing Sheet

(51) Int. Cl.
*H04N 21/24* (2011.01)
*H04N 21/2343* (2011.01)
*H04N 21/647* (2011.01)

(52) U.S. Cl.
CPC .......... *H04L 65/605* (2013.01); *H04L 67/322* (2013.01); *H04N 21/234327* (2013.01); *H04N 21/2401* (2013.01); *H04N 21/64738* (2013.01); *H04N 21/64769* (2013.01); *H04L 67/02* (2013.01)

(56) References Cited

U.S. PATENT DOCUMENTS

| | | | |
|---|---|---|---|
| 2005/0033879 | A1 | 2/2005 | Hwang et al. |
| 2005/0036546 | A1 | 2/2005 | Rey et al. |
| 2007/0064609 | A1 | 3/2007 | Igarashi |
| 2007/0097926 | A1* | 5/2007 | Liu ................. H04L 47/10 370/335 |
| 2007/0268823 | A1* | 11/2007 | Madison ............ H04L 47/10 370/229 |
| 2011/0093605 | A1 | 4/2011 | Choudhury et al. |
| 2012/0173748 | A1* | 7/2012 | Bouazizi ........... H04L 65/4084 709/231 |

FOREIGN PATENT DOCUMENTS

| | | |
|---|---|---|
| CN | 1663205 | 8/2005 |
| JP | 2004-194295 | 7/2004 |
| JP | 2007-074225 | 3/2007 |
| JP | 2011-180810 | 9/2011 |
| WO | WO 03/045047 A2 | 5/2003 |
| WO | WO 2011/047335 | 4/2011 |
| WO | WO 2012/059376 | 5/2012 |

OTHER PUBLICATIONS

International Search Report for PCT/EP2013/059355 dated Jul. 15, 2013.

Shigeyuki Sakazawa et al., A Study on Dynamic Control of Coding Rate for TCP Video Streaming, Technical Report of IEICE, Japan, The Institute of Electronics, Information and Communication Engineers, Nov. 15, 2002, vol. 102, No. 469, pp. 19-24. ISSN: 0913-5685.

Osamu Koizumi, Voice and Video Information Processing, No. 6 Reviewing Mechanism for Transmission and QoS, Network Communication Understanding Frame/Packet Processing, Compilation for Network Mechanism, 2nd Shot, Fine Classification and Exhaustive Illustration, N+I Network, Japan, Softbank Publishing Inc., Jun. 1, 2005, vol. 5, No. 6, pp. 81-84 (English translation for a portion cited by the Japanese Examiner attached).

Takumi Kimura et al., Comparison of DiffServ Traffic Engineering Methods, Technical Report of IEICE, Japan, The Institute of Electronics, Information and Communication Engineers, Mar. 2, 2001, vol. 100, No. 672, pp. 233-240, ISSN: 0913-5685.

* cited by examiner

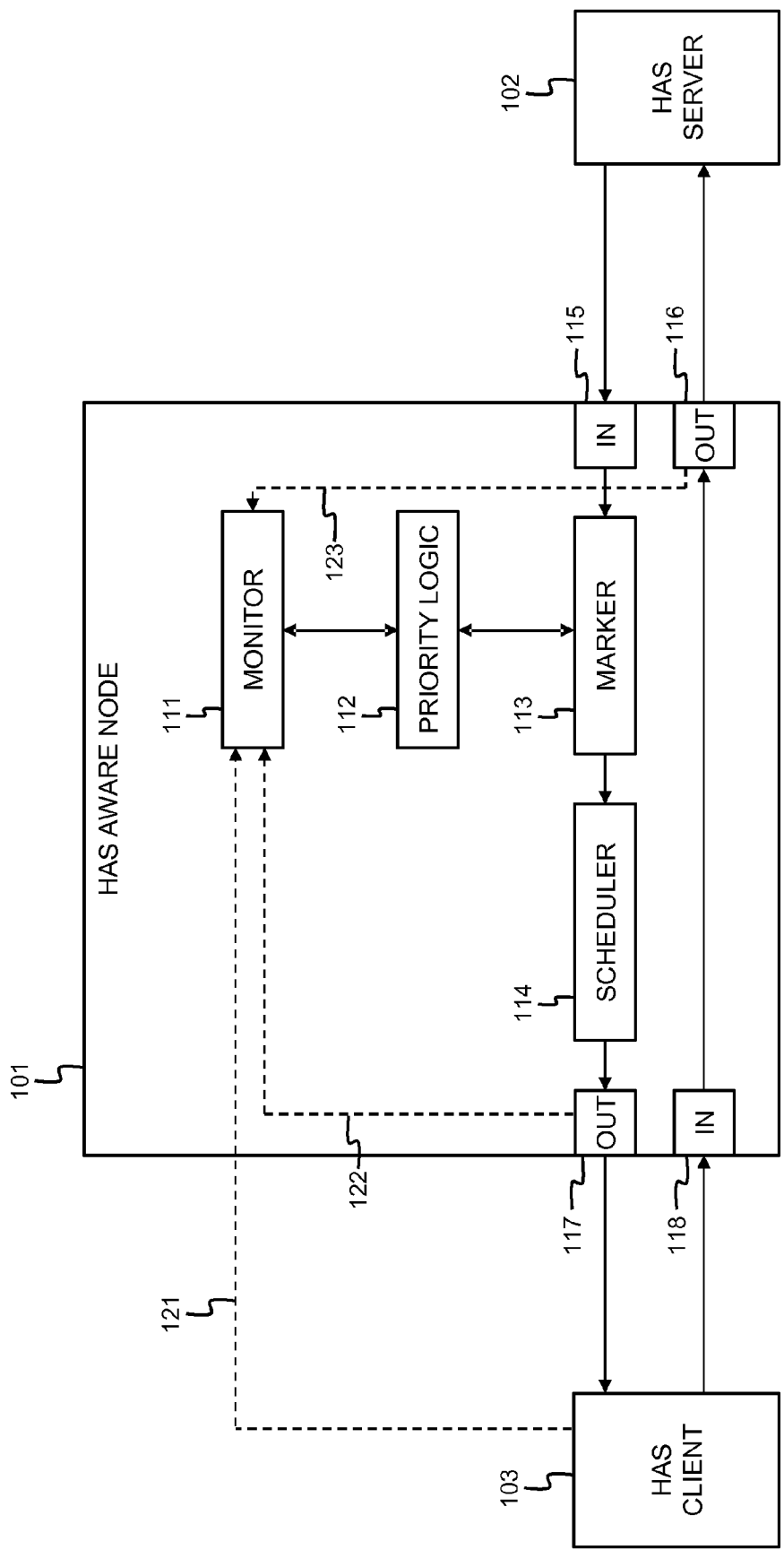

ADAPTIVE STREAMING AWARE NETWORK NODE, CLIENT AND METHOD WITH PRIORITY MARKING

FIELD OF THE INVENTION

The present invention generally relates to adaptive streaming of video segments, i.e. fixed size or variable size fragments of a video stream with a typical length of a few seconds that are deliverable in different quality levels. These video fragments are also called chunks or segments. The invention in particular aims at reducing the risk for buffer underrun for video delivery using adaptive streaming.

BACKGROUND OF THE INVENTION

Video is increasingly delivered using adaptive streaming (AS) techniques, like for instance HTTP based adaptive streaming (HAS). Using adaptive streaming, a video item, e.g. a file or stream, is encoded and made available in different quality levels. The video client estimates the highest sustainable quality level based on its own measurements, and requests the video item in this highest sustainable quality level. In case of HTTP adaptive streaming for instance, each segment is made available through the HTTP server together with a manifest file describing the video item in terms of available quality levels and required segments for play-out. The video client initiates play-out by requesting the manifest file from the HTTP server. The video client thereafter starts downloading the video segments by sending an HTTP-GET request for each segment. The desired quality is specified for each segment in the HTTP-GET request. The video client thereto incorporates a client heuristic that decides autonomously on the quality level of each requested video segment. The quality selection by the client heuristic is based on client terminal specifications, like for instance the display size, supported decoders, the processing power of the client device, information related to the ongoing session such as the filling level of the buffer at the client, etc., and the client's own estimation of the network conditions typically perceived bandwidth on the link estimated by measuring the transfer rate of previous, received video segments.

Since the video client decides autonomously on the requested quality levels, each client shall try to optimize its own experience. Video servers and intermediate elements do not have any control on the quality level that is selected by the client. As a result of for instance network congestion or sub-optimal decisions by the quality level determination algorithm, buffer starvation or buffer underrun may happen at the client side, leading to interruption of video play-out and discomfort of the user watching the video stream.

It is an objective of the present invention to disclose an adaptive streaming aware system and method that overcomes or reduces the above identified problem of buffer underrun or buffer starvation.

SUMMARY OF THE INVENTION

According to the present invention, the above defined objective is realized by the adaptive streaming aware network node defined by claim 1, able to stream video segments of a video session to a client, the video segments being available in one or more quality levels, and each video segment being delivered to the client in a quality level specified in a request received from the client, the adaptive streaming aware network node comprising:
  session monitoring means for collecting buffer fill information indicative for a buffer volume at the client occupied by the video session;
  priority calculation means for determining a priority level for video segments of the session in function of the buffer fill information; and
  video segment marking means for marking video segments of the session with the priority level.

Thus, opposite to existing systems that offer no possibility to differentiate the treatment of ordinary video segments from segments that are required by a client in risk of buffer starvation, the present invention combines adaptive streaming of video with session monitoring and priority setting such that Quality-of-Service (QoS) mechanisms implemented in the network are exploited to offer a better a treatment in the network to video segments requested by a client in risk of buffer starvation/underrun. More specifically, an adaptive streaming aware network node operating according to the present invention shall monitor the volume of buffer space at the client that is occupied by a video session, and configure priorities for the video packets or segments belonging to that video session based on the monitoring.

According to an optional aspect, defined by claim 2, the said session monitoring means in the adaptive streaming aware node according to the current invention may be adapted to receive and interpret a dedicated message from the client indicating that buffer volume occupied by the video session is below a predefined threshold.

Thus, one way to collect buffer fill information may rely on the client sending dedicated messages each time the buffer volume occupied by segments of a particular video session drops below a threshold. Such implementation will result in threshold based priority setting for video packets in the network. Obviously, if plural priorities are available, plural thresholds may be predefined such that the network gradually increases the priority level of video segments when the buffer fill level of the corresponding session drops below different (decreasing) thresholds.

Alternatively or complementary, as defined by claim 3, the session monitoring means in the adaptive streaming aware node according to the invention may be adapted to receive and interpret periodic reports from the client informative on an actual buffer volume occupied by the video session.

Thus, to detect timely that a client is near buffer starvation for a particular video session, the client could periodically report on the buffer fill level during the ongoing adaptive streaming session. Such periodic reporting will increase the signalling in the network but enables the adaptive streaming aware network node that configures the priorities to timely estimate and anticipate on buffer starvation/underrun. The periodic reporting may or may not be combined with dedicated messaging in case the buffer fill level drops below a threshold.

Alternatively or complementary, as defined by claim 4, the session monitoring means in the adaptive streaming aware node according to the invention may be adapted to capture data on video segments that pass through the adaptive streaming aware node, and may be adapted to estimate from the data captured a buffer fill level at the client.

Hence, yet another way to gain knowledge on the buffer fill level and the risk for buffer starvation/underrun may rely on the monitoring of traffic passing through the node. By counting the number or rate of video segments passing through the node for a particular session, the node is able to estimate the buffer fill level at the client and derive therefrom priorities for further treatment of video segments belonging to that session. Such monitoring of traffic has the advantage not to rely on messaging from the client which may arrive late in particular in situations of network congestion. The skilled person will also appreciate that such monitoring may be combined with periodic or dedicated messaging from the client in order to further reduce the risk for buffer starvation/underrun in case estimation based on local traffic monitoring would be inaccurate.

Optionally, as defined by claim 5, the session monitoring means in the adaptive streaming aware node according to the present invention may further be adapted to collect one or more of the following:
  information indicative for a user subscription type;
  information indicative for a downloaded quality;
  information indicative for a network load;
  information indicative for a content identifier;
  information indicative for a source of content; and/or
  information on the requested quality.

Indeed, in addition to the buffer fill level at client side, other information could be taken into account to configure the priority level of video segments of a particular video session. Information on the type of subscription may for instance be helpful in determining if and when segments of a video session delivered to a certain user must be prioritized. Information on the requested or downloaded quality level may assist in determining the required priority level to avoid buffer starvation/underrun as soon as the buffer fill level drops below a certain threshold. Similarly, knowledge of the actual network load or available capacity towards the client may be taken into account when determining the priority level of video segments transmitted to a client in risk of buffer starvation/underrun. Further, an identification of the content and/or an identification of the source of the content in the video session, may help the node according to the current invention to determine the priority level and consequently the efforts imposed on the network to better treat the video segments of that session in order to avoid buffer starvation/underrun at the client. The skilled person will appreciate that the above list of information that could be taken into account for setting the priority level of video packets/segments in an adaptive streaming session towards a client in risk of buffer starvation/underrun is not exhaustive.

In a first possible implementation of the present invention:
  the priority calculation means are adapted to determine a DSCP (Differentiated Services Code Point) value when the buffer volume drops below a predefined threshold; and
  the video segment marking means are adapted to insert the DSCP value in packet headers of packets belonging to the session.

Thus, the present invention could be realised using existing DiffServ technology for marking the video packets with priorities.

Alternatively or complementary:
  the priority calculation means may be adapted to determine an L-LSP (Label-only-inferred Label Switched Path) or to determine an EXP (Experimental) bit value depending on one or more thresholds exceeded by the buffer volume; and
  the video segment marking means may be adapted to configure the L-LSP or to insert the EXP bit value in an E-LSP (Experimental-bit-inferred Label Switched Path) MPLS (Multiprotocol Label Switching) header of packets belonging to the session.

Thus, the present invention could also be implemented in combination with exiting MPLS technology for marking the video packets with priorities.

According to an optional aspect, the adaptive streaming aware network node according to the present invention may further comprise:
  scheduling means adapted to schedule delivery of video segments to the client in a manner that influences a quality level in future requests from the client.

Thus, the node implementing the present invention could additionally be equipped with scheduling functionality to control the delivery rate or delivery duration of video segments. This would enable the node for instance to influence the client's quality level selection algorithm such that a specific quality level is different from what would normally be requested.

In addition to an adaptive streaming aware node, the present invention also relates to a corresponding method to stream in an adaptive streaming aware network node video segments of a video session to a client, the video segments being available in one or more quality levels, and each video segment being delivered to the client in a quality level specified in a request received from the client, the method comprising:
  collecting in the adaptive streaming aware network node buffer fill information indicative for a buffer volume at the client occupied by the video session;
  determining in the adaptive streaming aware network node a priority level for video segments of the session in function of the buffer fill information; and
  marking in the adaptive streaming aware network node video segments of the session with the priority level.

The present invention further also relates to a corresponding adaptive streaming aware client, able to receive video segments of a video session, the video segments being available in one or more quality levels, and able to specify a quality level for delivery of the video segments in a request, the adaptive streaming aware client comprising:
  priority detection means adapted to detect that video segments are marked with a priority level.

Indeed, advantageously the client is adapted to detect that priorities are being used. The client algorithm that determines the requested quality level for video segments can then take into account that video packets/segments of a particular session were transmitted with increased priority.

BRIEF DESCRIPTION OF THE DRAWINGS

FIG. 1 is a functional block scheme of an embodiment of the adaptive streaming aware node according to the present invention.

DETAILED DESCRIPTION OF EMBODIMENT(S)

FIG. 1 shows the functional blocks of a system implementing the current invention. FIG. 1 more particularly shows an HTTP Adaptive Streaming (HAS) client 103, a HAS server 102, and an HAS aware node 101 in between implementing the current invention.

The HAS aware node 101 comprises a monitoring function 111, priority configuration logic 112, a packet marker 113 and a scheduler 114. In addition, the HAS aware node 101 may comprise routing or switching functionality, caching functionality, packet processing functionality, etc., depending on the type of intermediate node that it represents. FIG. 1 further shows an input port 115 for receiving video segments from HAS server 102, an output port 116 for sending requests to HAS server 102, an output port 117 for sending video segments to HAS client 103 and an input port 118 for receiving requests from HAS client 103.

In an HTTP adaptive streaming (HAS), video is encoded in several bit rates and segmented in pieces of typically a number of seconds. Delivery of video segments from the HAS server 102 to the HAS client 103, or from an intermediate caching node to the HAS client 103 is done over standard HTTP. A client application installed in the HAS client 103 monitors the network bandwidth and determines which quality version/bit rate to request for a segment based on this monitored bandwidth and eventual other information, e.g. the buffer filling at the client side. This buffer is used for temporary storage of the video segments and playout of the video stream and must at any time contain a number of video segments in order to avoid interrupts during playout. The information on which versions/bit rates are available for which segments is typically located in a so called manifest file. The HAS client 103 initiates play-out by requesting the manifest file from the HAS server 102. The HAS client 103 thereafter starts downloading the video segments by sending an HTTP-GET request for each segment. The desired quality is specified for each segment in the HTTP-GET request. Delivery of the video segments is done from a single central server or from a content delivery network (CDN), i.e. a system of distributed servers. The delivery of this type of service is done over the best-effort Internet.

The monitoring function 111 in the intermediate HAS aware node 101 gathers information on the buffer volume that is occupied at the HAS client 103 by segments of a particular HAS session. Eventually, the monitoring function 111 also gathers other parameters such as the type of subscription, the requested quality level, the actual network load and/or information on the content or content source. This information is shared with the priority determination logic 112 in order to enable the latter to take a decision on the priority level that will be assigned to further segments of the HAS session in order to avoid buffer starvation/underrun at the HAS client 103.

As is indicated by arrow 121 in FIG. 1, the monitoring function 111 receives information from the HAS client 103. Thereto, the HAS client 103 is configured to periodically report the buffer fill level for the ongoing HAS session and/or signals to the monitoring function 111 each time the buffer fill level for the HAS session drops below a predefined threshold of for instance 3 seconds video playtime. In addition, the monitoring function 111 captures data from video segments passing through node 101, as is indicated by arrows 122 and 123 in FIG. 1. By counting for instance within a certain time interval the amount of requests for video segments sent towards the HAS server 102 via output port 116 and/or counting the number of video segments delivered to the HAS client 103 via output port 117, the monitoring function 111 can estimate the amount of buffer space at the client 103 filled with segments belonging to the HAS session that is monitored. This information may be combined with information received from the HAS client 103 in order to have a more accurate prediction of the risk for buffer starvation/underrun at the HAS client 103.

The priority determination logic 112 considers the information received from the monitoring function 111 and decides whether or not the video packets/segments of a specific HAS session should be sent over high priority channels. The priority determination logic for instance may compare the buffer fill level information as estimated by the monitoring function 111 with one or more thresholds. As soon as the estimated buffer fill level drops below a threshold, the priority level is increased for that HAS session.

An example implementation of the priority determination logic 112 in a DiffSery supporting network compares the monitored buffer fill level with a predefined threshold, e.g. 3 seconds video playtime. When the monitored buffer fill level drops below 3 seconds video playtime for a particular HAS session, the DSCP (Differentiated Services Code Point) value in the packet header of video packets belonging to that HAS session is set to the highest priority.

An example implementation of the priority determination logic 112 in an MPLS system also compares the monitored buffer fill level with a predetermined threshold of e.g. 3 seconds video playtime. As soon as the monitored buffer fill level of a particular HAS session drops below the 3 seconds threshold, a suitable L-LSP (Label-only-inferred Label Switched Path) is selected or the EXP (Experimental) bits of an E-LSP are set. (Experimental-bit-inferred Label Switched Path). In this case, the priority for treatment of the packets/segments belonging to that HAS session is determined by the selected LSP. All packets in the L-LSP will be handled with the same priority. In the E-LSP, the priority is inferred by the EXP bits in the MPLS header. In the E-LSP, packets with different priorities can be transported.

The packet marker 113 makes the required arrangements to transmit further video segments/packets of the monitored HAS session that is in risk of buffer starvation/underrun with the selected priority. It will mark the packets, for instance by inserting the appropriate DSCP value in the packet header, or it may configure the LSP.

The scheduler 114 influences the quality level that is selected by the HAS client 103 when priority marking of the video packets/segments is enabled. The scheduler thereto controls the delivery rate of the priority marked video segments in such a manner that the HAS client 103 starts requesting a specific quality level.

Although the present invention has been illustrated by reference to a specific embodiment, it will be apparent to those skilled in the art that the invention is not limited to the details of the foregoing illustrative embodiment, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An adaptive streaming aware network node able to stream video segments of a video session to a client, said video segments being available in one or more quality levels, and video segments being delivered to said client in a quality level specified in a request received from said client,
wherein said adaptive streaming aware network node comprises a processor which executes:
a session monitor configured to collect buffer fill information indicative of a buffer volume at said client occupied by said video session;
a priority calculator configured to determine a priority level for video segments of said session as a function of said buffer fill information; and
a marking video segment marker configured to mark video segments of said session with said priority level,
wherein said priority calculator is configured to determine a differentiated services code point (DSCP) value when said buffer volume drops below a predefined threshold; and
wherein said video segment marker is configured to insert said DSCP value in packet headers of packets belonging to said session.

2. The adaptive streaming aware network node according to claim 1, wherein said session monitor is configured to receive and interpret a dedicated message from said client indicating that buffer volume occupied by said video session is below a predefined threshold.

3. The adaptive streaming aware network node according to claim 1, wherein said session monitor is configured to receive and interpret periodic reports from said client informative on an actual buffer volume occupied by said video session.

4. The adaptive streaming aware network node according to claim 1, wherein said session monitor is configured to capture data on video segments that pass through said adaptive streaming aware node, and adapted to estimate from said data captured a buffer fill volume at said client.

5. The adaptive streaming aware network node according to claim 1, wherein said session monitor is configured to collect one or more of the following:
information indicative of a user subscription type;
information indicative of a downloaded quality;
information indicative of a network load;
information indicative of a content identifier;
information indicative of a source of content; and/or
information on the requested quality.

6. The adaptive streaming aware network node according to claim 1, wherein:
said priority calculator is configured to determine a label-only-inferred label switched path (L-LSP) or to determine an experimental (EXP) bit value depending on one or more thresholds exceeded by said buffer volume; and
said video segment marker is adapted to configure said L-LSP or to insert said EXP bit value in an experimental-bit-inferred label switched path (E-LSP) multiprotocol label switching (MPLS) header of packets belonging to said session.

7. The adaptive streaming aware network node according to claim 1, wherein the processor executes:
a scheduler configured to schedule delivery of video segments to said client in a manner that influences a quality level in future requests from said client.

8. A method to stream in an adaptive streaming aware network node video segments of a video session to a client, said video segments being available in one or more quality levels, and video segments being delivered to said client in a quality level specified in a request received from said client,
wherein said method comprises:
collecting in said adaptive streaming aware network node buffer fill information indicative of a buffer volume at said client occupied by said video session;
determining in said adaptive streaming aware network node a priority level for video segments of said session as a function of said buffer fill information; and
marking in said adaptive streaming aware network node video segments of said session with said priority level,
wherein the method further comprises:
determining a differentiated services code point (DSCP) value when said buffer volume drops below a predefined threshold,
inserting said DSCP value in packet headers of packets belonging to said session.

9. An adaptive streaming aware system able to receive video segments of a video session, said video segments being available in one or more quality levels, and able to specify a quality level for delivery of said video segments in a request,
wherein said adaptive streaming aware system comprises a processor which executes:
a session monitor configured to collect buffer fill information indicative of a buffer volume at said client occupied by said video session;
a priority calculator configured to determine a priority level for video segments of said session as a function of said buffer fill information;
a marking video segment marker configured to mark video segments of said session with said priority level; and
a priority detector that detects video segments marked with a priority level,
wherein said priority calculator is configured to determine a differentiated services code point (DSCP) value when said buffer volume drops below a predefined threshold; and
wherein said video segment marker is configured to insert said DSCP value in packet headers of packets belonging to said session.

* * * * *